(12) United States Patent
Saito et al.

(10) Patent No.: US 11,042,012 B2
(45) Date of Patent: Jun. 22, 2021

(54) OPTICAL SYSTEM AND IMAGING APPARATUS INCLUDING THE SAME

(71) Applicant: CANON KABUSHIKI KAISHA, Tokyo (JP)

(72) Inventors: Shinichiro Saito, Utsunomiya (JP); Makoto Nakahara, Utsunomiya (JP); Suguru Inoue, Utsunomiya (JP); Akira Mizuma, Utsunomiya (JP); Masakazu Yamagishi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 16/178,364

(22) Filed: Nov. 1, 2018

(65) Prior Publication Data

US 2019/0155003 A1 May 23, 2019

(30) Foreign Application Priority Data

Nov. 20, 2017 (JP) .............................. JP2017-223150

(51) Int. Cl.

| | |
|---|---|
| *G02B 9/12* | (2006.01) |
| *G02B 13/02* | (2006.01) |
| *G02B 7/04* | (2021.01) |
| *G02B 15/16* | (2006.01) |
| *G02B 27/00* | (2006.01) |
| *G02B 7/02* | (2021.01) |
| *G02B 15/14* | (2006.01) |

(52) U.S. Cl.
CPC ............. *G02B 13/02* (2013.01); *G02B 7/021* (2013.01); *G02B 7/04* (2013.01); *G02B 9/12* (2013.01); *G02B 15/143101* (2019.08); *G02B 15/16* (2013.01); *G02B 27/0025* (2013.01); *G02B 27/0062* (2013.01)

(58) Field of Classification Search
CPC ........................................................ G02B 9/12
USPC .................................................. 359/784–792
See application file for complete search history.

(56) References Cited

U.S. PATENT DOCUMENTS

| | | | |
|---|---|---|---|
| 2011/0090576 A1 | 4/2011 | Sugita | |
| 2013/0021513 A1* | 1/2013 | Eguchi | ..................... G02B 9/12 348/335 |
| 2016/0274336 A1* | 9/2016 | Kawamura | ............ G02B 13/02 |
| 2017/0351059 A1* | 12/2017 | Gyoda | ............... G02B 27/0025 |
| 2018/0095242 A1* | 4/2018 | Iwamoto | .................. G02B 9/64 |
| 2020/0026047 A1* | 1/2020 | Hosoi | ..................... G03B 17/14 |

FOREIGN PATENT DOCUMENTS

| | | |
|---|---|---|
| JP | 2011-81604 A | 4/2011 |
| JP | 2015-215561 A | 12/2015 |

* cited by examiner

*Primary Examiner* — Darryl J Collins
(74) *Attorney, Agent, or Firm* — Canon U.S.A., Inc. IP Division

(57) ABSTRACT

An optical system includes a first lens unit B1 having a positive refractive power, a second lens unit B2, and a third lens unit B3 disposed in order from an object side to an image side. The second lens unit B2 moves in focusing so that an interval between adjacent lens units among the first, second, and third lens units changes. The first lens unit B1 includes a positive lens G1p disposed closest to the object side and a negative lens G1n being a closest negative lens with respect to the object side. The optical system satisfies a predetermined condition.

17 Claims, 7 Drawing Sheets

OPTICAL SYSTEM AND IMAGING APPARATUS INCLUDING THE SAME

BACKGROUND

Field of the Disclosure

The present disclosure relates to an optical system and an imaging apparatus including the optical system, and for example, is suitable for an imaging apparatus using an image sensor, such as a digital still camera, a video camera, a monitoring camera, or a broadcasting camera, or suitable for an imaging apparatus such as a camera using a silver halide photographic film.

Description of the Related Art

As an imaging optical system having a long focal length, a so-called telephoto-type imaging optical system is known, in which an optical system having positive refractive power is placed on an object side, and an optical system having negative refractive power is placed on an image side. The telephoto-type imaging optical system is used for a single-focus ultra-telephoto lens, for example.

In an ultra-telephoto lens, generally, the longer the focal length, the more axial chromatic aberration or magnification chromatic aberration occurs. As a technique for excellently correcting these types of chromatic aberration, a technique for increasing the number of lenses placed on an object side and causing the lenses to share the action of correcting chromatic aberration is known. However, the effective diameter of a lens placed on the object side of the ultra-telephoto lens is likely to be large. Thus, if an attempt is made to correct chromatic aberration by the above technique, the weight of an imaging optical system increases.

In an imaging optical system discussed in Japanese Patent Application Laid-Open No. 2015-215561, positive lenses formed of a material having low dispersion and anomalous dispersion are placed successively from furthest on an object side, thereby correcting axial chromatic aberration and magnification chromatic aberration.

SUMMARY OF THE INVENTION

The present invention is directed to providing an optical system which is small and in which aberration such as chromatic aberration is excellently corrected, and an imaging apparatus including the optical system.

According to an aspect of the present invention, an optical system includes a first lens unit having a positive refractive power, a second lens unit, and a third lens unit disposed in order from an object side to an image side, the second lens unit configured to move in focusing so that an interval between adjacent lens units among the first, second, and third lens units changes, wherein the first lens unit includes a positive lens G1$p$ disposed closest to the object side and a negative lens G1$n$ being a closest negative lens with respect to the object side, and wherein the following conditional expressions are satisfied:

$$0.02 < BF/fG1p < 0.14$$

$$2.00 < |fG1p/fG1n| < 10.00$$

$$20.0 < vdG1n < 40.0$$

$$-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.7268) < -0.0010$$

where BF is a back focus of the optical system, fG1$p$ is a focal length of the positive lens G1$p$, fG1$n$ is a focal length of the negative lens G1$n$, vdG1$n$ is an Abbe number of a material of the negative lens G1$n$, and θgFG1$n$ is a partial dispersion ratio of the negative lens G1$n$.

Further features of the present invention will become apparent from the following description of exemplary embodiments with reference to the attached drawings.

DESCRIPTION OF THE EMBODIMENTS

Based on the attached drawings, exemplary embodiments of an optical system and an imaging apparatus including the optical system according to the present invention will be described in detail below. The optical system according to each exemplary embodiment includes a first lens unit having positive refractive power, a second lens unit, and a third lens unit placed in order from an object side to an image side. The second lens unit moves in focusing, so that the interval between adjacent lens units among the lens units changes. A "lens unit" is a lens element that moves in an integrated manner in focusing. The "lens unit" may only need to include one or more lenses, and may not need to include a plurality of lenses.

Figure 1:
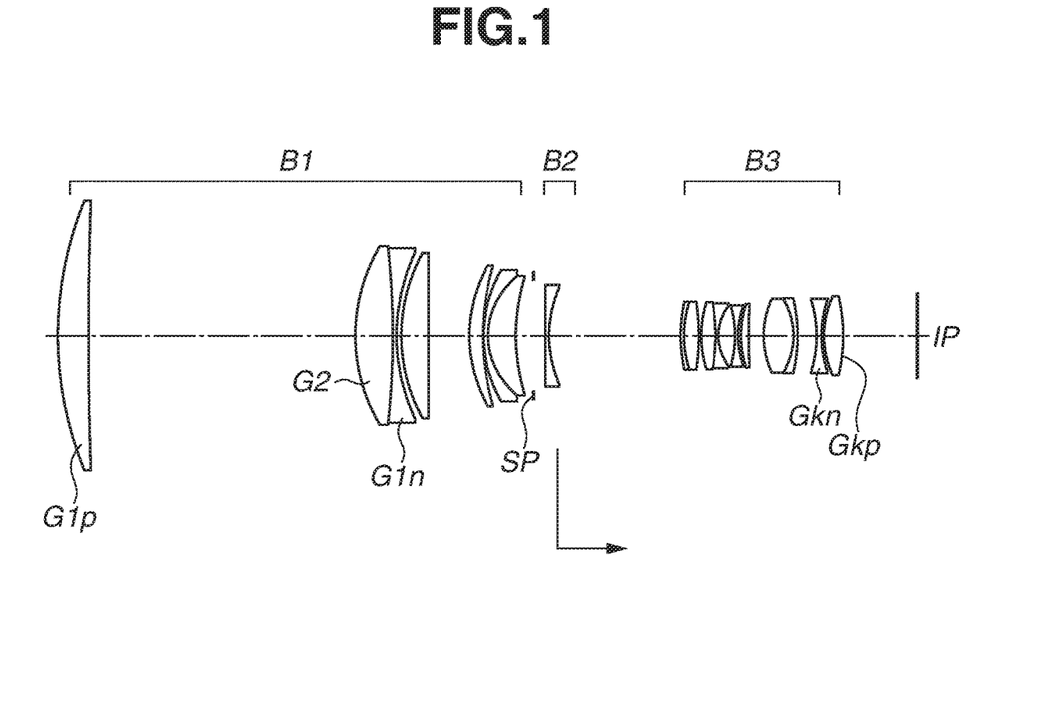
FIG. 1 is a lens cross-sectional view of an optical system according to a first exemplary embodiment.
Figure 3:
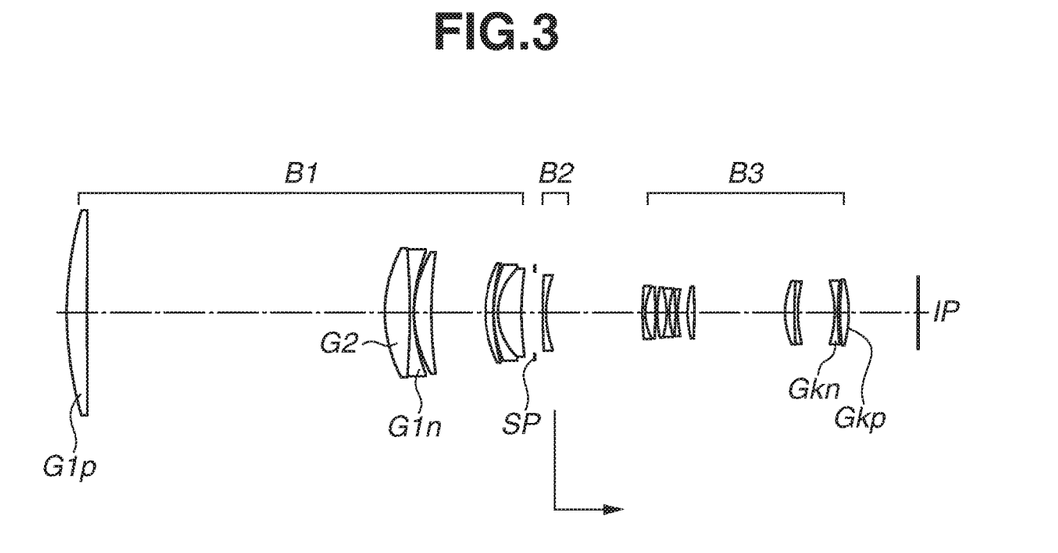
FIG. 3 is a lens cross-sectional view of an optical system according to a second exemplary embodiment.
Figure 5:
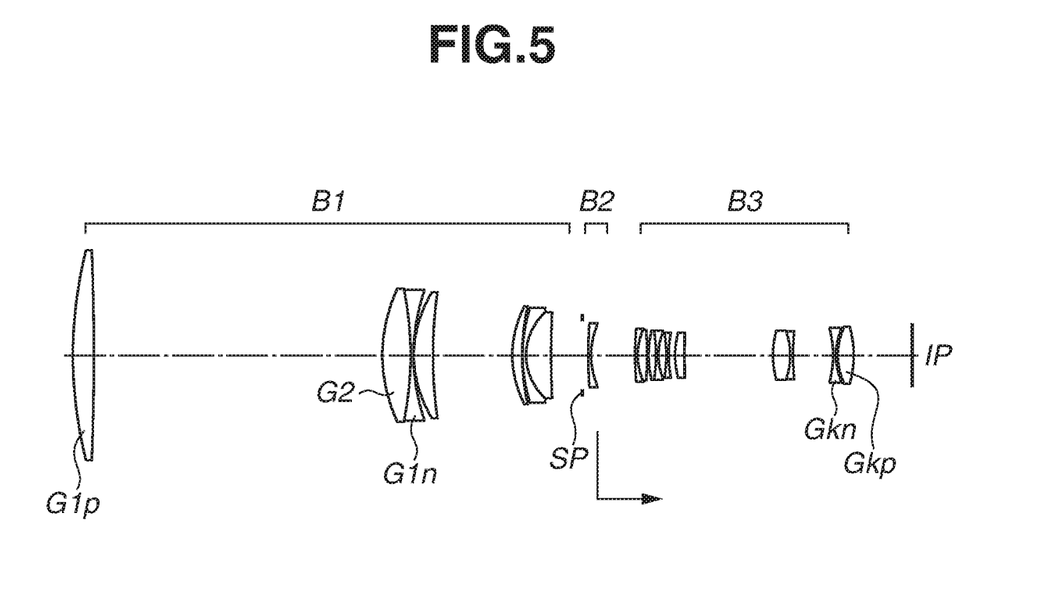
FIG. 5 is a lens cross-sectional view of an optical system according to a third exemplary embodiment.

FIGS. 1, 3, and 5 are cross-sectional views of optical systems according to first to third exemplary embodiments, respectively. The optical system according to each exemplary embodiment is an imaging lens system for use in an imaging apparatus such as a video camera, a digital camera, a silver halide film camera, or a television camera. In each lens cross-sectional view, the left is an object side (the front), and the right is an image side (the rear). Further, in the lens cross-sectional view, when j represents the order of lens units from the object side to the image side, B$j$ indicates a j-th lens unit.

In each exemplary embodiment, the cross-sectional view illustrates an aperture stop SP. In the optical system according to each exemplary embodiment, the aperture stop SP is placed between a first lens unit B1 and a second lens unit B2.

The cross-sectional view illustrates an image plane IP. When the optical system is used as an imaging optical system of a video camera or a digital camera, the image plane IP corresponds to a solid-state image sensor (a photoelectric conversion element) such as a charge-coupled device (CCD) sensor or a complementary metal-oxide-semiconductor (CMOS) sensor. When the optical system according to each exemplary embodiment is used as an imaging optical system of a silver halide film camera, the image plane IP corresponds to a film surface.

Figure 2:
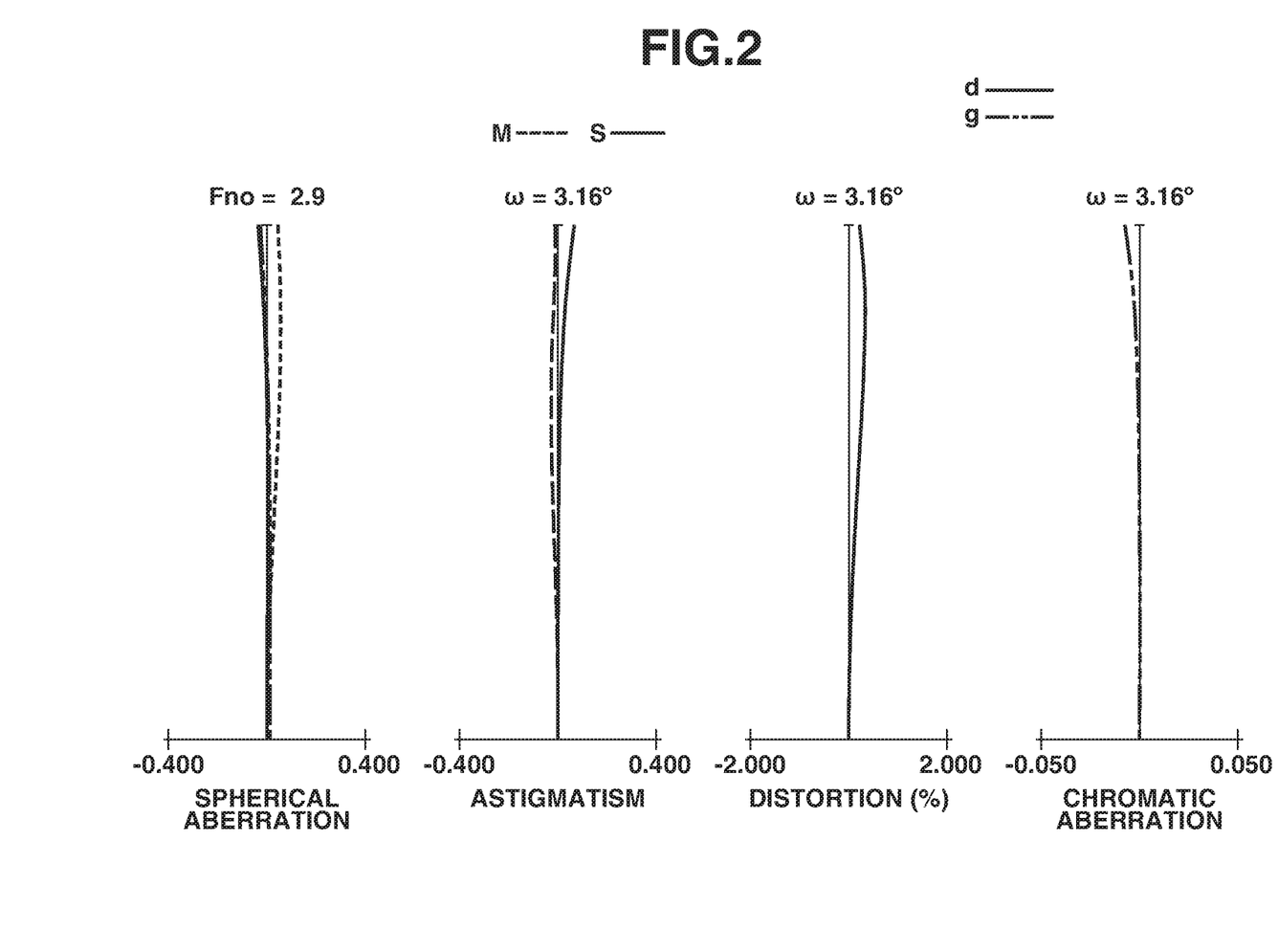
FIG. 2 is aberration diagrams of the optical system according to the first exemplary embodiment when the optical system focuses on infinity.
Figure 4:
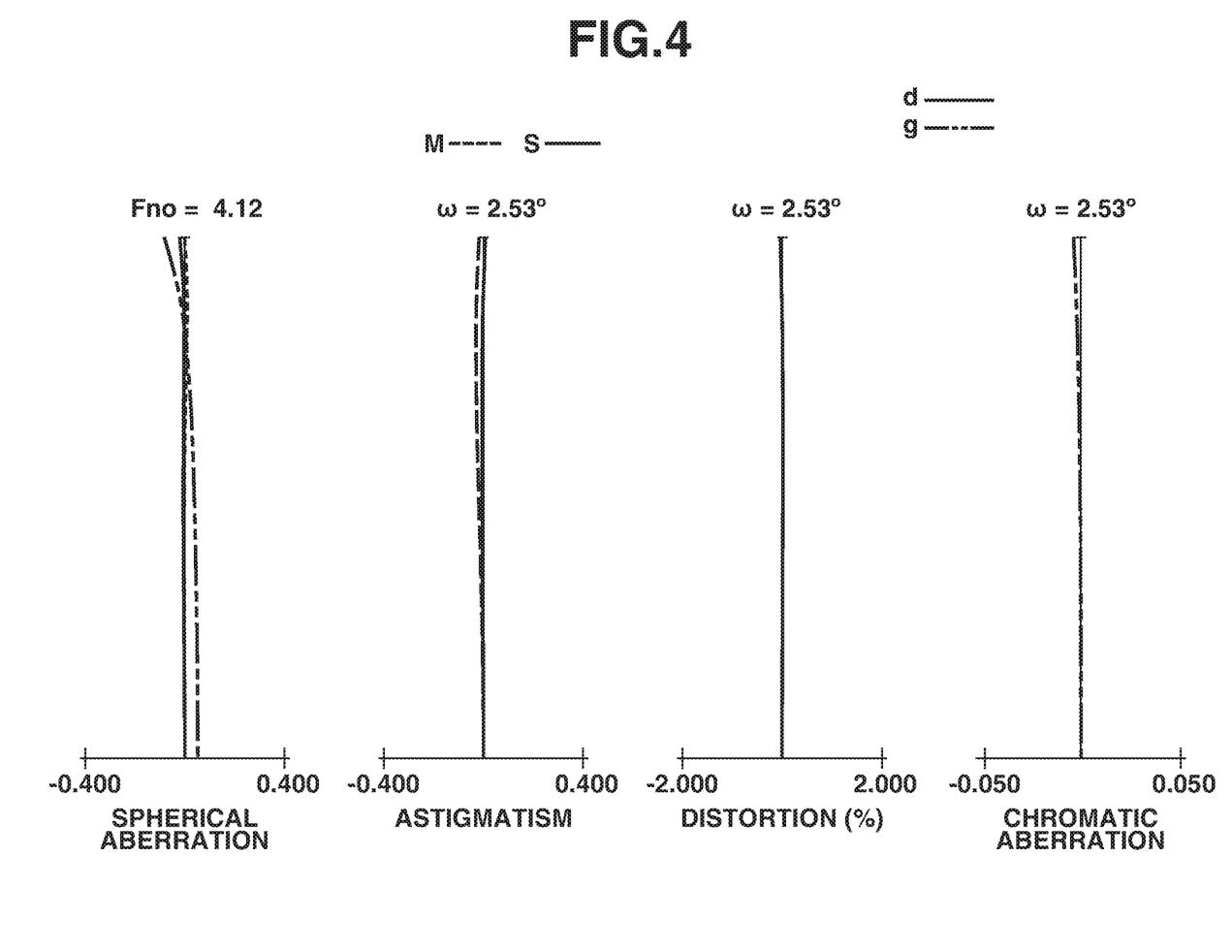
FIG. 4 is aberration diagrams of the optical system according to the second exemplary embodiment when the optical system focuses on infinity.
Figure 6:
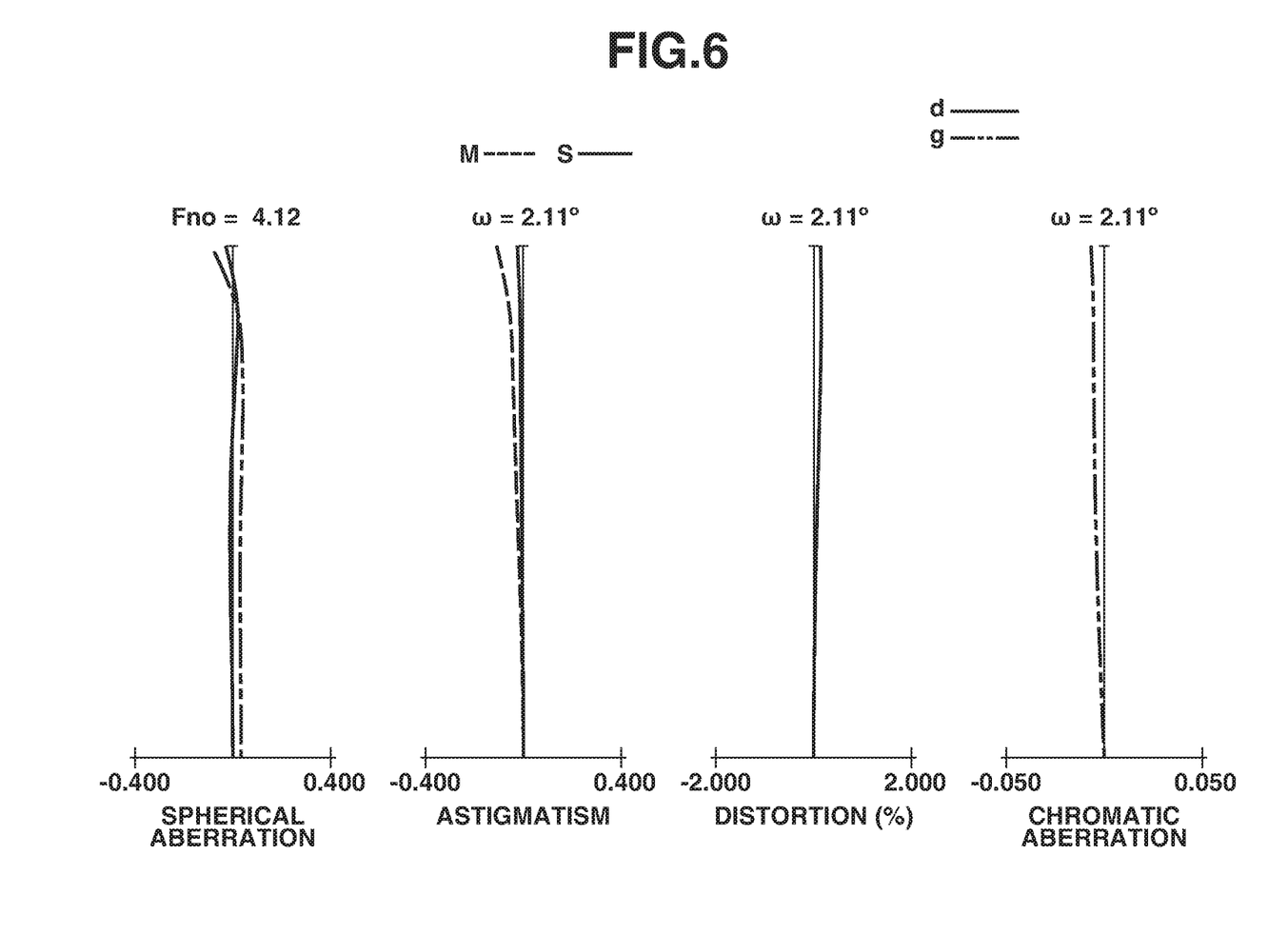
FIG. 6 is aberration diagrams of the optical system according to the third exemplary embodiment when the optical system focuses on infinity.

FIGS. 2, 4, and 6 are aberration diagrams of the optical systems according to the first to third exemplary embodiments, respectively, when the optical systems focus on infinity.

In each spherical aberration diagram, Fno is an F-number and represents spherical aberration at the d-line (a wavelength of 587.6 nm) and the g-line (a wavelength of 435.8 nm). In each astigmatism diagram, S represents the amount of astigmatism on a sagittal image plane, and M represents the amount of astigmatism on a meridional image plane. Each distortion diagram illustrates distortion at the d-line. Each chromatic aberration diagram illustrates chromatic aberration at the g-line. ω represents an imaging half angle of view.

In the optical system according to each exemplary embodiment, as indicated by an arrow in the lens cross-sectional view, the second lens unit B2 moves to the image side in focusing from infinity to a close distance so that the interval between adjacent lens units among the lens units changes. That is, in the optical system according to each exemplary embodiment, the second lens unit B2 corresponds to a focus unit.

Further, in the optical system according to each exemplary embodiment, as an image stabilization unit, some lenses of the optical system are moved in a direction having a component perpendicular to the optical axis, whereby it is possible to change the image formation position. Consequently, it is possible to correct image blurring. Any of the first lens unit B1, the second lens unit B2, and a third lens unit B3 may be used as the image stabilization unit, or some lenses included in a particular lens unit may be used as the image stabilization unit.

In the optical system according to each exemplary embodiment, a material having high dispersion and high anomalous dispersion is used for negative lenses included in the first lens unit B1, thereby excellently correcting chromatic aberration. In a conventional ultra-telephoto lens, the material of positive lenses included in the first lens unit B1 is appropriately set, thereby reducing the amount of occurrence of chromatic aberration. Thus, the effect of correcting chromatic aberration using the negative lenses included in the first lens unit B1 is not sufficient. In response, in the optical system according to each exemplary embodiment, a material having high dispersion and high anomalous dispersion is used for the negative lenses included in the first lens unit B1, thereby enhancing the effect of correcting chromatic aberration in the negative lenses included in the first lens unit B1, and excellently correcting chromatic aberration in the entirety of the optical system.

As parameters related to the correction of chromatic aberration in the optical system, an Abbe number νd and a partial dispersion ratio θgF are known. The Abbe number νd and the partial dispersion ratio θgF are represented by the following expressions:

$$\nu d = (Nd-1)/(NF-NC)$$

$$\theta gF = (Ng-NF)/(NF-NC)$$

where the refractive indices of a material at the g-line (a wavelength of 435.8 nm), the F-line (486.1 nm), the C-line (656.3 nm), and the d-line (587.6 nm) are Ng, NF, NC, and Nd, respectively.

Generally, a material having high dispersion is used as the material of a negative lens placed in a lens unit having positive refractive power as a whole, whereby it is possible to obtain the effect of correcting primary chromatic aberration. Further, a material having high anomalous dispersion is used as the material of a negative lens placed in a lens unit having positive refractive power as a whole, whereby it is possible to excellently correct secondary magnification chromatic aberration.

The anomalous dispersion of a material used for a lens is described. In the specification of the present application, an indicator ΔθgF of the strength of anomalous dispersion is defined by the following expression.

$$\Delta\theta gF = \theta gF - (-1.665 \times 10^{-7} \times \nu d^3 + 5.213 \times 10^{-5} \times \nu d^2 - 5.656 \times 10^{-3} \times \nu d + 0.7268)$$

In many optical materials, the value of ΔθgF is a value near zero. The further away from zero the value of ΔθgF, the higher the anomalous dispersion of the material.

The optical system according to each exemplary embodiment satisfies the following expressions (1) to (4):

$$0.02 < BF/fG1p < 0.14 \quad (1)$$

$$2.00 < |fG1p/fG1n| < 10.00 \quad (2)$$

$$20.00 < \nu dG1n < 40.00 \quad (3)$$

$$-0.1000 < \theta gFG1n - (-1.665 \times 10^{-7} \times \nu dG1n^3 + 5.213 \times 10^{-5} \times \nu dG1n^2 - 5.656 \times 10^{-3} \times \nu dG1n + 0.7268) < -0.0010 \quad (4)$$

where the back focus of the optical system is BF, the focal length of a positive lens G1p placed furthest on the object side among the positive lenses included in the first lens unit B1 is fG1p, and the focal length, the Abbe number, and the partial dispersion ratio of a negative lens G1n placed furthest on the object side among the negative lenses included in the first lens unit B1 are fG1n, νdG1n, and θgFG1n, respectively.

Conditional expression (1) defines the relationship between the back focus BF of the optical system and the focal length fG1p of the positive lens G1p. Conditional expression (1) is satisfied, whereby it is possible to achieve a small optical system having a short entire length. If BF/fG1p exceeds the upper limit of conditional expression (1), the back focus BF is too long. As a result, the optical system and the imaging apparatus to which the optical system is attached become large in the optical axis direction, which is not desirable. Further, if BF/fG1p falls below the lower limit of conditional expression (1), the back focus BF is too short. In this case, the diameter of a lens placed furthest on the image side of the optical system is too large. Thus, the diameter of a mount for attaching the optical system to the imaging apparatus becomes large. As a result, it is difficult to configure the optical system and the imaging apparatus to be small and light. Further, if the back focus BF is made so small that BF/fG1p falls below the lower limit of conditional expression (1), while the diameter of the final lens of the optical system is made small, the angle of incidence of the ray on the image sensor is large. As a result, image quality is likely to decrease particularly in the periphery of the image, which is not desirable.

Conditional expression (2) is a conditional expression defining the ratio between the focal length fG1p of the positive lens G1p and the focal length fG1n of the negative lens G1n. If |fG1p/fG1n| falls below the lower limit of conditional expression (2), and the focal length fG1p of the positive lens G1p is short, the refractive power of the positive lens G1p is too strong. Thus, a large amount of axial chromatic aberration occurs in the positive lens G1p, which is not desirable. To correct the axial chromatic aberration occurring in the positive lens G1p using the negative lenses included in the first lens unit B1, it is necessary to increase the number of negative lenses. This makes the optical system heavy, which is not desirable.

Further, if |fG1p/fG1n| exceeds the upper limit of conditional expression (2), and the focal length fG1p of the positive lens G1p is long, the refractive power of the positive lens G1p is too weak. As a result, the positive lens G1p cannot sufficiently converge light, and the effective diameter of a lens placed on the image side of the positive lens G1p is large. This makes the optical system heavy, which is not desirable.

Conditional expression (3) is a conditional expression defining the Abbe number vdG1n of the material of the negative lens G1n. A material having high dispersion is used as the material of the negative lens G1n included in the first lens unit B1 having positive refractive power, whereby it is possible to excellently correct primary chromatic aberration. If vdG1n falls below the lower limit of conditional expression (3), magnification chromatic aberration is excessively corrected in the negative lens G1n, which is not desirable. Further, if vdG1n exceeds the upper limit of conditional expression (3), it is difficult to sufficiently correct magnification chromatic aberration in the negative lens G1n, which is not desirable.

Conditional expression (4) is a conditional expression defining the anomalous dispersion $\Delta\theta gFG1n$ of the material of the negative lens G1n. The negative lens G1n is formed using a material having high anomalous dispersion, whereby it is possible to enhance the effect of correcting secondary magnification chromatic aberration. A material that falls below the lower limit of conditional expression (4) is less practical for an imaging optical system. If a material that exceeds the upper limit of conditional expression (4) is used as the material of the negative lens G1n, it is difficult to sufficiently correct secondary magnification chromatic aberration, which is not desirable.

In the optical system according to each exemplary embodiment, as a result of considering the balance of aberration correction in the entirety of the optical system, NBFD15 (manufactured by Hoya Corporation; vd=33.27, $\theta gF=0.5883$, and $\Delta\theta gF=-0.0019$) is used as a material forming the negative lens G1n. The negative lens G1n according to the present invention may be formed of a material satisfying both expressions (3) and (4). Examples of the material satisfying both expressions (3) and (4) include S-LAH79 (manufactured by Ohara Corporation; vd=28.27, $\theta gF=0.5980$, and $\Delta\theta gF=-0.0068$). Alternatively, S-NBH56 (manufactured by Ohara Corporation; vd=24.80, $\theta gF=0.6122$, and $\Delta\theta gF=-0.0039$) may be used.

In each exemplary embodiment, as described above, elements are appropriately set to satisfy conditional expressions (1) to (4). Consequently, it is possible to obtain an optical system which is small and in which aberration such as chromatic aberration is excellently corrected.

In each exemplary embodiment, it is desirable to set the numerical ranges of conditional expressions (1) to (4) as follows.

$$0.02 < BF/fG1p < 0.11 \tag{1a}$$

$$2.50 < |fG1p/fG1n| < 8.00 \tag{2a}$$

$$21.00 < vdG1n < 39.00 \tag{3a}$$

$$-0.0300 < \theta gFG1n - (-1.665 \times 10^{-7} \times vdG1n^3 + 5.213 \times 10^{-5} \times vdG1n^2 - 5.656 \times 10^{-3} \times vdG1n + 0.72 - 68) < -0.0013 \tag{4a}$$

Further, it is more desirable to set the numerical ranges of conditional expressions (1) to (4) as follows.

$$0.04 < BF/fG1p < 0.09 \tag{1b}$$

$$2.20 < |fG1p/fG1n| < 7.00 \tag{2b}$$

$$23.00 < vdG1n < 36.00 \tag{3b}$$

$$-0.0020 < \theta gFG1n - (-1.665 \times 10^{-7} \times vdG1n^3 + 5.213 \times 10^{-5} \times vdG1n^2 - 5.656 \times 10^{-3} \times vdG1n + 0.72 - 68) < -0.0015 \tag{4b}$$

As described above, a material having high anomalous dispersion is used as the material of the negative lens G1n, whereby the positive lenses included in the first lens unit B1 can be placed relatively on the image side. Consequently, it is possible to effectively reduce the weight of the first lens unit B1. Thus, it is possible to both make the optical system small and excellently correct chromatic aberration.

Further, in each exemplary embodiment, it is more desirable to satisfy one or more of the following conditional expressions.

$$0.13 < D12/LD < 0.50 \tag{5}$$

$$1.50 < fG1p/fG2 < 5.00 \tag{6}$$

$$vdG2 > 73.00 \tag{7}$$

$$0.0100 < \theta gFG2 - (-1.665 \times 10^{-7} \times vdG2^3 + 5.213 \times 10^{-5} \times vdG2^2 - 5.656 \times 10^{-3} \times vdG2 + 0.7268) < 0.1000 \tag{8}$$

$$0.05 < BF/IH < 2.20 \tag{9}$$

$$0.05 < BF/fG2 < 0.23 \tag{10}$$

$$1.02 < |fGkp/fGkn| < 2.50 \tag{11}$$

In the above conditional expressions, the distance on the optical axis from a lens surface furthest on the object side of the first lens unit B1 to the image plane is LD. Further, the distance on the optical axis between a lens G2 placed adjacent to the positive lens G1p on the image side and the positive lens G1p is D12, the focal length of the lens G2 is fG2, the Abbe number of the material of the lens G2 is vdG2, and the partial dispersion ratio of the material of the lens G2 is $\theta gFG2$.

Further, the maximum image height is IH. The maximum image height IH indicates half the diagonal length of the range of use of the image sensor used to form an output image.

Further, the focal length of a positive lens Gkp placed furthest on the image side among positive lenses included in the third lens unit B3 is fGkp, and the focal length of a negative lens Gkn placed furthest on the image side among negative lenses included in the third lens unit B3 is fGkn.

Conditional expression (5) is an expression defining the ratio between the distance D12 on the optical axis between the positive lens G1p and the lens G2 placed adjacent to the positive lens G1p on the image side, and the entire lens length LD. If D12/LD falls below the lower limit of conditional expression (5), and the distance D12 between the positive lens G1p and the lens G2 is short, the effective diameter of the lens G2 is large. Thus, the weight of the lens G2 increases, which is not desirable. If D12/LD exceeds the upper limit of conditional expression (5), and the distance D12 between the positive lens G1p and the lens G2 is long, it is difficult to correct spherical aberration and chromatic aberration occurring in the positive lens G1p using the lens G2 and lenses after that, which is not desirable.

Further, it is desirable that the lens G2 should have positive refractive power. Two positive lenses are placed successively from furthest on the object side of the optical system, whereby it is possible to largely converge a ray passing through the lenses. As a result, the effective diameter of a lens placed further on the image side than the lens G2 can be made small. Consequently, it is possible to make the entirety of the optical system lighter.

Conditional expression (6) is a conditional expression defining the ratio between the focal length fG1p of the positive lens G1p and the focal length fG2 of the lens G2. If fG1p/fG2 falls below the lower limit of conditional expression (6), and the focal length fG1p of the positive lens G1p is short, the refractive power of the positive lens G1p is too strong. Thus, a large amount of axial chromatic aberration occurs in the positive lens G1p, which is not desirable. To correct the axial chromatic aberration occurring in the positive lens G1p using the negative lenses included in the first lens unit B1, it is necessary to increase the number of negative lenses. This makes the optical system heavy, which is not desirable.

Further, if fG1p/fG2 exceeds the upper limit of conditional expression (6), and the focal length fG1p of the positive lens G1p is long, the refractive power of the positive lens G1p is too weak. As a result, the positive lens G1p cannot sufficiently converge light, and the effective diameter of the lens placed on the image side of the positive lens G1p is large. This makes the optical system heavy, which is not desirable.

Conditional expression (7) is a conditional expression defining the Abbe number vdG2 of the material of the lens G2. If vdG2 falls below the lower limit of conditional expression (7), and the Abbe number vdG2 is small, a large amount of chromatic aberration occurs in the lens G2, which is not desirable.

Conditional expression (8) is a conditional expression defining the anomalous dispersion of the material of the lens G2. The lens G2 is formed using a material having high anomalous dispersion, whereby it is possible to enhance the effect of correcting secondary magnification chromatic aberration. A material that falls below the lower limit of conditional expression (8) is less practical as an optical material used for an imaging optical system. If a material that exceeds the upper limit of conditional expression (8) is used as the material of the lens G2, it is difficult to sufficiently correct secondary magnification chromatic aberration, which is not desirable.

In the optical system according to each exemplary embodiment, as a result of considering the balance of aberration correction in the entirety of the optical system, FCD100 (manufactured by Hoya Corporation; vd=95.10, θgF=0.5334, and ΔθgF=0.0162) is used as a material forming the lens G2. Examples of another material satisfying both expressions (7) and (8) include S-FPL53 (manufactured by Ohara Corporation; vd=94.93, θgF=0.5340, and ΔθgF=0.0168). Alternatively, S-FPL51 (manufactured by Ohara Corporation; vd=81.54, θgF=0.5375, and ΔθgF=0.0168) may be used.

Conditional expression (9) is a relational expression between the back focus BF of the optical system and the maximum image height IH. If BF/IH exceeds the upper limit of conditional expression (9), the entire length is too long. Thus, the weight of a mechanical member (a lens barrel) for holding the optical system is great. Thus, it is difficult to make the optical system light. Further, if BF/IH falls below the lower limit of conditional expression (9), the back focus BF is too short. In this case, the diameter of the lens placed furthest on the image side of the optical system is too large. Thus, the diameter of the mount for attaching the optical system to the imaging apparatus becomes large. As a result, it is difficult to configure the optical system and the imaging apparatus to be small and light. Further, if the back focus BF is made so small that BF/IH falls below the lower limit of conditional expression (9), while the diameter of the final lens of the optical system is made small, the angle of incidence of the ray on the image sensor is large. As a result, image quality is likely to decrease particularly in the periphery of the image, which is not desirable.

Conditional expression (10) is a relational expression between the back focus BF of the optical system and the focal length fG2 of the lens G2. If BF/fG2 exceeds the upper limit of conditional expression (10), the entire length is too long. Thus, the weight of the mechanical member (the lens barrel) for holding the optical system is great. Thus, it is difficult to make the optical system light. Further, if BF/fG2 falls below the lower limit of conditional expression (10), the back focus BF is too short. In this case, the diameter of the lens placed furthest on the image side of the optical system is too large. Thus, the diameter of the mount for attaching the optical system to the imaging apparatus becomes large. As a result, it is difficult to configure the optical system and the imaging apparatus to be small and light. Further, if the back focus BF is made so small that BF/fG2 falls below the lower limit of conditional expression (10), while the diameter of the final lens of the optical system is made small, the angle of incidence of the ray on the image sensor is large. As a result, image quality is likely to decrease particularly in the periphery of the image, which is not desirable.

Conditional expression (11) defines the relationship between the focal length fGkp of the positive lens Gkp located furthest on the image side among the positive lenses of the third lens unit B3, and the focal length fGkn of the negative lens Gkn located furthest on the image side among the negative lenses of the third lens unit B3. Conditional expression (11) is satisfied, whereby it is possible to excellently correct distortion and magnification chromatic aberration while shortening the entire length of the optical system.

If |fGkp/fGkn| exceeds the upper limit of conditional expression (11), this is advantageous for shortening the entire length of the optical system, but the correction of distortion and magnification chromatic aberration is likely to be insufficient, which is not desirable.

If |fGkp/fGkn| falls below the lower limit of conditional expression (11), field curvature and distortion are large, which is not desirable.

It is desirable to set the numerical ranges of conditional expressions (5) to (11) as follows.

$$0.15 < D12/LD < 0.45 \tag{5a}$$

$$1.55 < fG1p/fG2 < 4.50 \tag{6a}$$

$$vdG2 > 80.00 \tag{7a}$$

$$0.0120 < \theta gFG2 - (-1.665 \times 10^{-7} \times vdG2^3 + 5.213 \times 10^{-5} \times vdG2^2 - 5.656 \times 10^{-3} \times vdG2 + 0.7268) < 0.0600 \tag{8a}$$

$$0.06 < BF/IH < 2.00 \tag{9a}$$

$$0.06 < BF/fG2 < 0.21 \tag{10a}$$

$$1.04 < |fGkp/fGkn| < 2.20 \tag{11a}$$

It is more desirable to set the numerical ranges of conditional expressions (5) to (11) as follows.

$$0.17 < D12/LD < 0.40 \quad (5b)$$

$$1.60 < fG1p/fG2 < 4.00 \quad (6b)$$

$$vdG2 > 90.00 \quad (7b)$$

$$0.0150 < \theta gFG2 - (-1.665 \times 10^{-7} \times vdG2^3 + 5.213 \times 10^{-5} \times vdG2^2 - 5.656 \times 10^{-3} \times vdG2 + 0.7268) < 0.0170 \quad (8b)$$

$$0.07 < BF/IH < 1.80 \quad (9b)$$

$$0.07 < BF/fG2 < 0.20 \quad (10b)$$

$$1.06 < |fGkp/fGkn| < 1.90 \quad (11b)$$

It is desirable that the second lens unit B2 that moves in focusing should include a single negative lens. Consequently, it is possible to make a mechanism for driving the second lens unit B2 small and light. Further, this facilitates quick focusing.

Further, in the optical system according to each exemplary embodiment, it is desirable that the first lens unit B1 should be immovable in focusing. The first lens unit B1 placed furthest on the object side among the lens units included in the optical system has a large effective diameter and is heavy. To move the first lens unit B1 having great weight in focusing, a large driving mechanism is required, and this makes the optical system and the imaging apparatus including the optical system heavy, which is not desirable.

Further, in the optical system according to each exemplary embodiment, it is desirable that the third lens unit B3 should include a positive lens and a negative lens in order from the image plane side. That is, it is desirable that the third lens unit B3 should include the positive lens Gkp placed furthest on the image side and the negative lens Gkn placed adjacent to the positive lens Gkp on the object side. A configuration is employed in which furthest on the image plane side of the optical system, a negative lens and a positive lens are placed in order from the object side, whereby it is possible to make the angle of incidence on the imaging surface small. This can suppress a decrease in the amount of light and a decrease in image quality in a peripheral portion of the image, which are problems in a case where a CMOS sensor or a CCD sensor is used as the image sensor.

Further, in the optical system according to each exemplary embodiment, it is desirable that both the second lens unit B2 and the third lens unit B3 should have negative refractive power. This can strengthen the tendency of telephoto-type power arrangement and shorten the entire length of the optical system.

Next, first to third numerical exemplary embodiments corresponding to the first to third exemplary embodiments, respectively, are illustrated. In each numerical exemplary embodiment, i represents the order of optical surfaces from the object side. ri represents the radius of curvature of an i-th optical surface (an i-th surface). di represents the interval between the i-th surface and an (i+1)-th surface when the optical system focuses on infinity. ndi and vdi represent the refractive index and the Abbe number, respectively, of the material of an i-th optical member at the d-line. Regarding the change in the interval between lens surfaces, the interval between the lens surfaces when the optical system focuses on infinity and the interval between the lens surfaces when the optical system focuses on the closest distance are illustrated.

In each numerical exemplary embodiment, the back focus (BF) represents the distance from a surface furthest on the image side of the optical system to the image plane as an air-converted length.

In each exemplary embodiment, protective glass for protecting a lens may be placed on the object side of the first lens unit B1. Further, protective glass or a low-pass filter may be placed between a lens placed furthest on the image plane side and the image plane. In the specification of the present application, optical members placed furthest on the object side of the optical system and furthest on the image side of the optical system and having extremely weak refractive power, such as protective glass and a low-pass filter, are not treated as lenses included in the optical system. An optical member having "extremely weak refractive power" refers to an optical member of which the absolute value of the focal length is five or more times the focal length of the entirety of the optical system.

In a case where an optical member having extremely weak refractive power is placed between the optical system and the image sensor, the value of the back focus BF is used when the value of the optical member having extremely weak refractive power placed between the optical system and the image sensor is an air-converted value.

First Numerical Exemplary Embodiment

| Unit: mm | | | | | |
|---|---|---|---|---|---|
| Surface Data | | | | | |
| Surface number | r | d | nd | vd | Effective diameter |
| 1 | 208.863 | 12.81 | 1.59522 | 67.7 | 135.17 |
| 2 | 2382.509 | 111.80 | | | 134.54 |
| 3 | 102.362 | 15.74 | 1.43700 | 95.1 | 89.59 |
| 4 | −468.113 | 0.00 | | | 87.76 |
| 5 | −468.113 | 1.50 | 1.80610 | 33.3 | 87.76 |
| 6 | 114.870 | 2.04 | | | 83.37 |
| 7 | 100.771 | 11.33 | 1.43700 | 95.1 | 83.11 |
| 8 | ∞ | 16.95 | | | 82.34 |
| 9 | 82.389 | 5.78 | 1.89286 | 20.4 | 70.56 |
| 10 | 140.543 | 0.20 | | | 69.07 |
| 11 | 73.987 | 2.00 | 1.83400 | 37.2 | 65.93 |
| 12 | 42.707 | 11.70 | 1.43700 | 95.1 | 59.92 |
| 13 | 117.076 | 7.33 | | | 57.82 |
| 14 (Stop) | ∞ | 5.00 | | | 54.98 |
| 15 | 2203.612 | 1.60 | 1.61800 | 63.4 | 51.02 |
| 16 | 70.804 | 55.04 | | | 48.37 |
| 17 | 90.626 | 1.40 | 1.89286 | 20.4 | 33.99 |
| 18 | 63.622 | 6.17 | 1.51742 | 52.4 | 33.76 |
| 19 | −141.334 | 1.00 | | | 33.75 |
| 20 | 62.995 | 6.11 | 1.80610 | 33.3 | 33.21 |
| 21 | −112.871 | 1.20 | 1.53775 | 74.7 | 32.36 |
| 22 | 28.360 | 7.05 | | | 29.59 |
| 23 | −61.753 | 1.20 | 1.72916 | 54.7 | 29.57 |
| 24 | 49.029 | 1.23 | | | 30.62 |
| 25 | 58.720 | 3.29 | 1.65412 | 39.7 | 31.53 |
| 26 | 384.248 | 6.25 | | | 31.95 |
| 27 | 51.293 | 12.56 | 1.64769 | 33.8 | 36.97 |
| 28 | −41.167 | 1.70 | 1.80810 | 22.8 | 36.94 |
| 29 | −94.283 | 8.00 | | | 37.29 |
| 30 | −67.868 | 2.00 | 1.85025 | 30.1 | 35.98 |
| 31 | 65.755 | 1.00 | | | 37.10 |
| 32 | 54.455 | 8.04 | 1.56732 | 42.8 | 38.88 |
| 33 | −98.899 | 31.01 | | | 39.42 |
| Image plane | ∞ | | | | |
| Various Types Of Data | | | | | |
| Focal length | | | | | 392.00 |
| F-number | | | | | 2.90 |

-continued

Unit: mm

| | |
|---|---|
| Angle of view | 3.16 |
| Image height | 21.64 |
| Entire lens length | 360.03 |
| BF | 31.01 |
| Entrance pupil position | 379.29 |
| Exit pupil position | −96.96 |
| Front principal point position | −429.43 |
| Rear principal point position | −360.99 |

Lens Unit Data

| Unit | Start surface | Focal length | Lens configuration length | Front principal point position | Rear principal point position |
|---|---|---|---|---|---|
| 1 | 1 | 183.77 | 199.18 | 99.64 | −110.90 |
| 2 | 15 | −118.41 | 1.60 | 1.02 | 0.03 |
| 3 | 17 | −2011.18 | 68.20 | 252.67 | 174.19 |

Single Lens Data

| Lens | Start surface | Focal length |
|---|---|---|
| 1 | 1 | 383.77 |
| 2 | 3 | 193.83 |
| 3 | 5 | −114.29 |
| 4 | 7 | 230.60 |
| 5 | 9 | 213.02 |
| 6 | 11 | −124.75 |
| 7 | 12 | 146.82 |
| 8 | 15 | −118.41 |
| 9 | 17 | −245.13 |
| 10 | 18 | 85.67 |
| 11 | 20 | 50.95 |
| 12 | 21 | −42.02 |
| 13 | 23 | −37.31 |
| 14 | 25 | 105.54 |
| 15 | 27 | 37.25 |
| 16 | 28 | −91.74 |
| 17 | 30 | −39.01 |
| 18 | 32 | 63.10 |

Second Numerical Exemplary Embodiment

Unit: mm

Surface Data

| Surface number | r | d | nd | vd | Effective diameter |
|---|---|---|---|---|---|
| 1 | 246.184 | 9.84 | 1.59349 | 67.0 | 118.93 |
| 2 | 7777.408 | 144.07 | | | 118.42 |
| 3 | 90.915 | 12.21 | 1.43700 | 95.1 | 74.98 |
| 4 | −527.016 | 0.00 | | | 73.66 |
| 5 | −527.016 | 1.85 | 1.80610 | 33.3 | 73.66 |
| 6 | 112.626 | 0.14 | | | 70.68 |
| 7 | 80.019 | 8.30 | 1.43700 | 95.1 | 70.47 |
| 8 | 289.154 | 26.22 | | | 69.69 |
| 9 | 73.539 | 3.98 | 1.92286 | 18.9 | 57.85 |
| 10 | 116.802 | 0.15 | | | 56.90 |
| 11 | 84.384 | 2.10 | 1.83481 | 42.7 | 55.90 |
| 12 | 39.915 | 11.42 | 1.43700 | 95.1 | 51.21 |
| 13 | 217.108 | 6.41 | | | 49.52 |
| 14 (Stop) | ∞ | 3.77 | | | 46.57 |
| 15 | 449.487 | 1.60 | 1.59522 | 67.7 | 44.02 |
| 16 | 69.954 | 46.69 | | | 42.28 |
| 17 | 200.917 | 1.30 | 1.89286 | 20.4 | 30.60 |
| 18 | 38.569 | 4.77 | 1.80610 | 33.3 | 29.82 |
| 19 | −622.316 | 1.03 | | | 29.52 |
| 20 | 86.674 | 4.54 | 1.66680 | 33.0 | 28.63 |
| 21 | −56.951 | 1.30 | 1.59522 | 67.7 | 28.06 |
| 22 | 48.644 | 2.97 | | | 26.48 |
| 23 | −148.460 | 1.10 | 1.77250 | 49.6 | 26.54 |
| 24 | 72.673 | 4.75 | | | 26.94 |
| 25 | 68.402 | 3.23 | 1.76182 | 26.5 | 29.85 |
| 26 | −451.612 | 44.09 | | | 30.00 |
| 27 | 54.085 | 4.62 | 1.66565 | 35.6 | 36.58 |
| 28 | 359.236 | 1.60 | 1.92286 | 20.9 | 36.20 |
| 29 | 86.966 | 17.75 | | | 35.63 |
| 30 | −68.784 | 1.60 | 1.72916 | 54.7 | 35.92 |
| 31 | 238.667 | 1.00 | | | 37.04 |
| 32 | 206.217 | 4.27 | 1.58144 | 40.8 | 37.66 |
| 33 | −83.915 | 33.39 | | | 37.99 |
| Image plane | ∞ | | | | |

Various Types of Data

| | |
|---|---|
| Focal length | 490.00 |
| F-number | 4.12 |
| Angle of view | 2.53 |
| Image height | 21.64 |
| Entire lens length | 412.08 |
| BF | 33.39 |
| Entrance pupil position | 463.65 |
| Exit pupil position | −117.91 |
| Front principal point position | −633.29 |
| Rear principal point position | −456.61 |

Lens Unit Data

| Unit | Start surface | Focal length | Lens configuration length | Front principal point position | Rear principal point position |
|---|---|---|---|---|---|
| 1 | 1 | 206.83 | 226.69 | 130.87 | −127.55 |
| 2 | 15 | −139.41 | 1.60 | 1.19 | 0.19 |
| 3 | 17 | −556.34 | 99.94 | 59.24 | −25.69 |

Single Lens Data

| Lens | Start surface | Focal length |
|---|---|---|
| 1 | 1 | 428.16 |
| 2 | 3 | 178.51 |
| 3 | 5 | −114.97 |
| 4 | 7 | 250.15 |
| 5 | 9 | 206.04 |
| 6 | 11 | −92.72 |
| 7 | 12 | 109.76 |
| 8 | 15 | −139.41 |
| 9 | 17 | −53.66 |
| 10 | 18 | 45.20 |
| 11 | 20 | 52.20 |
| 12 | 21 | −43.88 |
| 13 | 23 | −63.02 |
| 14 | 25 | 78.19 |
| 15 | 27 | 95.08 |
| 16 | 28 | −124.69 |
| 17 | 30 | −73.07 |
| 18 | 32 | 103.14 |

Third Numerical Exemplary Embodiment

Unit: mm

Surface Data

| Surface number | r | d | nd | vd | Effective diameter |
|---|---|---|---|---|---|
| 1 | 337.123 | 11.90 | 1.59349 | 67.0 | 142.72 |
| 2 | −2141.571 | 163.62 | | | 142.22 |

-continued

Unit: mm

| | | | | |
|---|---|---|---|---|
| 3 | 122.803 | 16.05 | 1.43700 | 95.1 | 90.55 |
| 4 | −259.830 | 0.00 | | | 88.96 |
| 5 | −259.830 | 1.60 | 1.80610 | 33.3 | 88.96 |
| 6 | 155.285 | 0.15 | | | 85.83 |
| 7 | 92.998 | 10.91 | 1.43387 | 95.1 | 85.67 |
| 8 | 356.639 | 44.95 | | | 84.69 |
| 9 | 82.341 | 5.68 | 1.84666 | 23.9 | 66.50 |
| 10 | 174.332 | 0.15 | | | 65.45 |
| 11 | 120.575 | 2.00 | 1.80420 | 46.5 | 64.32 |
| 12 | 44.732 | 14.19 | 1.43700 | 95.1 | 58.51 |
| 13 | 682.520 | 17.80 | | | 56.74 |
| 14 (Stop) | ∞ | 3.30 | | | 45.94 |
| 15 | 377.336 | 1.60 | 1.59349 | 67.0 | 43.47 |
| 16 | 61.273 | 24.90 | | | 41.50 |
| 17 | 214.060 | 1.50 | 1.89286 | 20.4 | 35.71 |
| 18 | 49.453 | 5.28 | 1.73800 | 32.3 | 34.86 |
| 19 | −421.466 | 0.97 | | | 34.55 |
| 20 | 84.928 | 4.22 | 1.80518 | 25.5 | 33.47 |
| 21 | −117.310 | 1.30 | 1.59349 | 67.0 | 32.93 |
| 22 | 47.131 | 4.55 | | | 30.55 |
| 23 | −106.050 | 1.30 | 1.81600 | 46.6 | 30.22 |
| 24 | 94.264 | 3.59 | | | 30.00 |
| 25 | 67.803 | 5.46 | 1.85478 | 24.8 | 30.63 |
| 26 | 3886.804 | 50.06 | | | 30.13 |
| 27 | 72.986 | 9.82 | 1.63980 | 34.5 | 33.25 |
| 28 | −57.663 | 1.60 | 1.89286 | 20.4 | 32.74 |
| 29 | 223.691 | 22.76 | | | 32.73 |
| 30 | −78.575 | 1.60 | 1.53775 | 74.7 | 35.35 |
| 31 | 53.409 | 1.00 | | | 37.05 |
| 32 | 52.308 | 9.05 | 1.51742 | 52.4 | 38.24 |
| 33 | −84.502 | 33.21 | | | 39.00 |
| Image plane | ∞ | | | | |

Various Types of Data

| | |
|---|---|
| Focal length | 588.00 |
| F-number | 4.12 |
| Angle of view | 2.11 |
| Image height | 21.64 |
| Entire lens length | 476.08 |
| BF | 33.21 |
| Entrance pupil position | 705.95 |
| Exit pupil position | −142.39 |
| Front principal point position | −675.02 |
| Rear principal point position | −554.79 |

Lens Unit Data

| Unit | Start surface | Focal length | Lens configuration length | Front principal point position | Rear principal point position |
|---|---|---|---|---|---|
| 1 | 1 | 234.60 | 289.00 | 193.11 | −160.97 |
| 2 | 15 | −123.49 | 1.60 | 1.20 | 0.20 |
| 3 | 17 | −1500.00 | 124.07 | −7.97 | −121.60 |

Single Lens Data

| Lens | Start surface | Focal length |
|---|---|---|
| 1 | 1 | 491.66 |
| 2 | 3 | 193.29 |
| 3 | 5 | −120.37 |
| 4 | 7 | 286.37 |
| 5 | 9 | 179.23 |
| 6 | 11 | −89.48 |
| 7 | 12 | 108.80 |
| 8 | 15 | −123.49 |
| 9 | 17 | −72.34 |
| 10 | 18 | 60.26 |
| 11 | 20 | 61.76 |
| 12 | 21 | −56.49 |
| 13 | 23 | −60.98 |
| 14 | 25 | 80.68 |
| 15 | 27 | 51.87 |

-continued

Unit: mm

| | | |
|---|---|---|
| 16 | 28 | −51.21 |
| 17 | 30 | −58.88 |
| 18 | 32 | 63.88 |

The following table 1 collectively illustrates various values in the optical system according to each exemplary embodiment. In table 1, $\Delta\theta gFG1n$ is the value of $\theta gFG1n-(-1.665\times10^{-7}\times vdG1n^3+5.213\times10^{-5}\times vdG1n^2-5.656\times10^{-3}\times vdG1n+0.7268)$. Further, $\Delta\theta gFG2$ is the value of $\theta gFG2-(-1.665\times10^{-7}\times vdG2^3+5.213\times10^{-5}\times vdG2^2-5.656\times10^{-3}\times vdG2+0.7268)$.

TABLE 1

| | | First exemplary embodiment | Second exemplary embodiment | Third exemplary embodiment |
|---|---|---|---|---|
| | f | 392.000 | 490.000 | 588.000 |
| | fG1p | 383.774 | 428.158 | 491.657 |
| | fG2 | 193.834 | 178.506 | 193.291 |
| | fG1n | −114.292 | −114.968 | −120.369 |
| | BF | 31.015 | 33.390 | 33.207 |
| | LD | 360.029 | 412.085 | 476.081 |
| | D12 | 111.800 | 144.071 | 163.622 |
| | IH | 21.640 | 21.640 | 21.640 |
| | θgFG1n | 0.5883 | 0.5883 | 0.5883 |
| | θgFG2 | 0.5334 | 0.5334 | 0.5334 |
| (1) | BF/fG1p | 0.081 | 0.078 | 0.068 |
| (2) | |fGp1/fG1n| | 3.358 | 3.724 | 4.085 |
| (3) | vdG1n | 33.27 | 33.27 | 33.27 |
| (4) | ΔθgFG1n | −0.0019 | −0.0019 | −0.0019 |
| (5) | D12/LD | 0.311 | 0.350 | 0.344 |
| (6) | fG1p/fG2 | 1.980 | 2.399 | 2.544 |
| (7) | vdG2 | 95.10 | 95.10 | 95.10 |
| (8) | ΔθgFG2 | 0.0162 | 0.0162 | 0.0162 |
| (9) | BF/IH | 1.433 | 1.543 | 1.535 |
| (10) | BF/fG2 | 0.160 | 0.187 | 0.172 |
| (11) | |fGkp/fGkn| | 1.618 | 1.412 | 1.085 |

Figure 7:
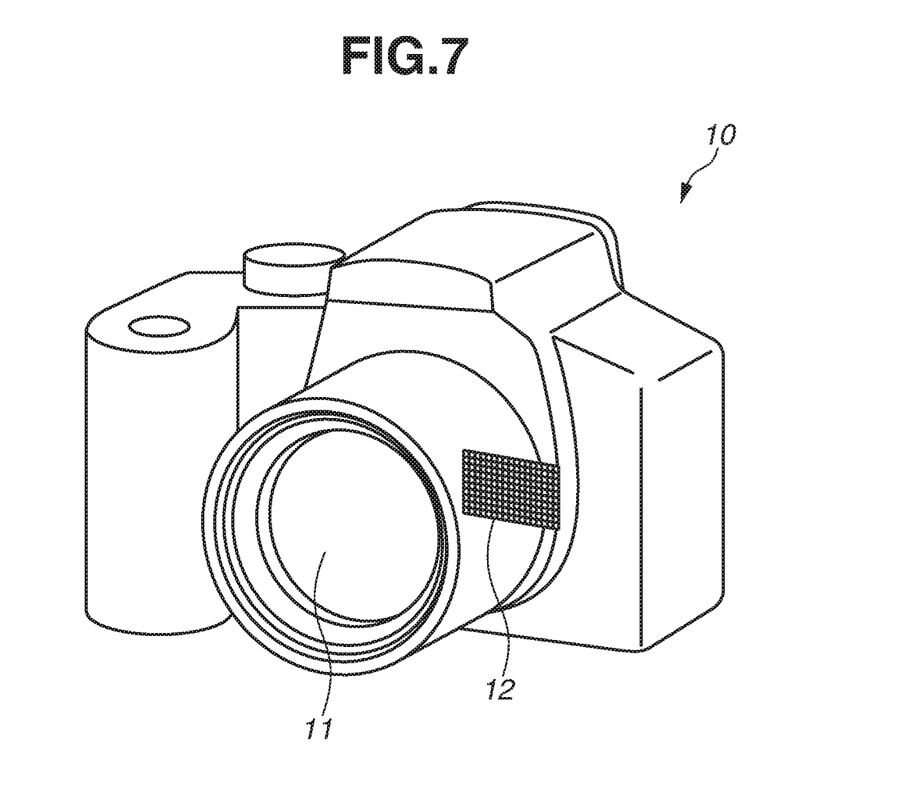
FIG. 7 is a schematic diagram of a main part of an imaging apparatus.

[Imaging Apparatus]

Next, with reference to FIG. 7, a description is given of a digital still camera (an imaging apparatus) in which the optical system according to each of the above exemplary embodiments is used as an imaging optical system. FIG. 7 illustrates a camera main body 10 and an imaging optical system 11, which includes the optical system according to any of the first to third exemplary embodiments. A solid-state image sensor (photoelectric conversion element) 12, such as a CCD sensor or a CMOS sensor, is built into the camera main body 10 and receives light of an object image formed by the imaging optical system 11.

As described above, the optical system according to each exemplary embodiment is applied to an imaging apparatus such as a digital still camera, whereby it is possible to obtain an imaging apparatus which is light and in which aberration such as chromatic aberration is excellently corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223150, filed Nov. 20, 2017, which is hereby incorporated by reference herein in its entirety.

What is claimed is:

1. An optical system comprising:
   a first lens unit having a positive refractive power;
   a second lens unit; and
   a third lens unit having a negative refractive power disposed in order from an object side to an image side, the second lens unit configured to move in focusing so that an interval between adjacent lens units among the first, second, and third lens units changes,
   wherein the first lens unit includes a positive lens G1$p$ disposed closest to the object side and a negative lens G1$n$ being a closest negative lens with respect to the object side, and
   wherein the following conditional expressions are satisfied:

$0.02 < BF/fG1p < 0.11$ $2.00 < |fG1p/fG1n| < 10.00$ $20.0 < vdG1n < 40.0$ $-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.7268) < -0.0010$ where BF is a back focus of the optical system representing a distance from a lens surface of the optical system closest to the image side to the image plane as an air-converted length, fG1$p$ is a focal length of the positive lens G1$p$, fG1$n$ is a focal length of the negative lens G1$n$, vdG1$n$ is an Abbe number of a material of the negative lens G1$n$, and $\theta$gFG1$n$ is a partial dispersion ratio of the negative lens G1$n$.

2. The optical system according to claim 1,
   wherein the first lens unit includes a lens G2 disposed adjacent to the positive lens G1$p$ at the image side, and
   wherein the following conditional expression is satisfied:

$0.13 < D12/LD < 0.50$ where D12 is a distance on an optical axis between the positive lens G1$p$ and the lens G2 and LD is a distance on the optical axis from a lens surface furthest on the object side of the first lens unit to an image plane.

3. The optical system according to claim 2, wherein the lens G2 has positive refractive power.

4. The optical system according to claim 3, wherein the following conditional expression is satisfied:

$0.05 < BF/fG2 < 0.23$ where fG2 is a focal length of the lens G2.

5. The optical system according to claim 3, wherein the following conditional expression is satisfied:

$1.5 < fG1p/fG2 < 5.0$ where fG2 is a focal length of the lens G2.

6. The optical system according to claim 3, wherein the following conditional expression is satisfied:

$vdG2 > 73.0$ where vdG2 is an Abbe number of a material of the lens G2.

7. The optical system according to claim 3, wherein the following conditional expression is satisfied:

$0.0100 < \theta gFG2 - (-1.665 \times 10^{-7} \times vdG2^3 + 5.213 \times 10^{-5} \times vdG2^2 - 5.656 \times 10^{-3} \times vdG2 + 0.7268) < 0.1000$ where vdG2 is an Abbe number of a material of the lens G2 and $\theta$gFG2 is a partial dispersion ratio of the lens G2.

8. The optical system according to claim 1, wherein the second lens unit has a negative refractive power and moves to the image side in focusing from infinity to a close distance.

9. The optical system according to claim 8, wherein the second lens unit consists of a single negative lens.

10. The optical system according to claim 1, wherein the first lens unit is immovable in focusing.

11. The optical system according to claim 1, wherein the third lens unit includes at least one positive lens and at least one negative lens and the following conditional expression is satisfied:

$1.02 < |fGkp/fGkn| < 2.50$ where fGkp is a focal length of a positive lens which is included in the third lens unit and is a closest positive lens with respect to the image side and fGkn is a focal length of a negative lens which is included in the third lens unit and is a closest negative lens with respect to the image side.

12. The optical system according to claim 1, wherein the third lens unit includes a positive lens Gkp disposed closest to the image side and a negative lens Gkn disposed adjacent to the positive lens Gkp on the object side.

13. An imaging apparatus comprising:
    an optical system; and
    an image sensor configured to receive light of an image formed by the optical system,
    wherein the optical system includes a first lens unit having a positive refractive power, a second lens unit, and a third lens unit having a negative refractive power disposed in order from an object side to an image side,
    wherein the second lens unit moves in focusing so that an interval between adjacent lens units among the first, second, and third lens units changes,
    wherein the first lens unit includes a positive lens G1$p$ disposed closest to the object side and a negative lens G1$n$ being a closest negative lens with respect to the object side, and
    wherein the following conditional expressions are satisfied:

$0.02 < BF/fG1p < 0.11$ $2.00 < |fG1p/fG1n| < 10.00$ $20.0 < vdG1n < 40.0$ $-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.7268) < -0.0010$ where BF is a back focus of the optical system representing a distance from a lens surface of the optical system closest to the image side to the image plane as an air-converted length, fG1$p$ is a focal length of the positive lens G1$p$, fG1$n$ is a focal length of the negative lens G1$n$, vdG1$n$ is an Abbe number of a material of the negative lens G1$n$, and $\theta$gFG1$n$ is a partial dispersion ratio of the negative lens G1$n$.

14. The imaging apparatus according to claim 13, wherein the following conditional expression is satisfied:

$0.05 < BF/IH < 2.20$ where IH is a maximum image height of the imaging apparatus.

15. An optical system comprising:
a first lens unit having a positive refractive power;
a second lens unit; and
a third lens unit disposed in order from an object side to an image side, the second lens unit configured to move in focusing so that an interval between adjacent lens units among the first, second, and third lens units changes,
wherein the first lens unit includes a positive lens G1$p$ disposed closest to the object side, a positive lens G2 disposed adjacent to the positive lens G1$p$ at the image side, and a negative lens G1$n$ being a closest negative lens with respect to the object side, and
wherein the following conditional expressions are satisfied:

$0.02 < BF/fG1p < 0.14$ $2.00 < |fG1p/fG1n| < 10.00$ $20.0 < vdG1n < 40.0$ $-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.72 - 68) < -0.0010$, and $0.13 < D12/LD < 0.50$ where BF is a back focus of the optical system representing a distance from a lens surface of the optical system closest to the image side to the image plane as an air-converted length, fG1$p$ is a focal length of the positive lens G1$p$, fG1$n$ is a focal length of the negative lens G1$n$, vdG1$n$ is an Abbe number of a material of the negative lens G1$n$, $\theta$gFG1$n$ is a partial dispersion ratio of the negative lens G1$n$, D12 is a distance on an optical axis between the positive lens G1$p$ and the positive lens G2, and LD is a distance on the optical axis from a lens surface furthest on the object side of the first lens unit to an image plane.

16. An optical system comprising:
a first lens unit having a positive refractive power;
a second lens unit; and
a third lens unit disposed in order from an object side to an image side, the second lens unit configured to move in focusing so that an interval between adjacent lens units among the first, second, and third lens units changes,
wherein the first lens unit includes a positive lens G1$p$ disposed closest to the object side and a negative lens G1$n$ being a closest negative lens with respect to the object side,
wherein the second lens unit consists of a single negative lens and is configured to move to the image side in focusing from infinity to a close distance, and
wherein the following conditional expressions are satisfied:

$0.02 < BF/fG1p < 0.14$ $2.0 < |fG1p/fG1n| < 10.00$ $20.0 < vdG1n < 40.0$ $-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.72 - 68) < -0.0010$ where BF is a back focus of the optical system representing a distance from a lens surface of the optical system closest to the image side to the image plane as an air-converted length, fG1$p$ is a focal length of the positive lens G1$p$, fG1$n$ is a focal length of the negative lens G1$n$, vdG1$n$ is an Abbe number of a material of the negative lens G1$n$, and $\theta$gFG1$n$ is a partial dispersion ratio of the negative lens G1$n$.

17. An optical system, comprising:
a first lens unit having a positive refractive power;
a second lens unit; and
a third lens unit disposed in order from an object side to an image side, the second lens unit configured to move in focusing so that an interval between adjacent lens units among the first, second, and third lens units changes,
wherein the first lens unit includes a positive lens G1$p$ disposed closest to the object side and a negative lens G1$n$ being a closest negative lens with respect to the object side, and
wherein the following conditional expressions are satisfied:

$0.02 < BF/fG1p < 0.14$ $2.00 < |fG1p/fG1n| < 10.00$ $20.0 < vdG1n < 40.0$ $-0.1000 < \theta gFG1n - (-1.665 \times 10^{-7} \times vdG1n^3 + 5.213 \times 10^{-5} \times vdG1n^2 - 5.656 \times 10^{-3} \times vdG1n + 0.72 - 68) < -0.0010$, and $1.02 < |fGkp/fGkn| < 2.50$ where BF is a back focus of the optical system representing a distance from a lens surface of the optical system closest to the image side to the image plane as an air-converted length, fG1$p$ is a focal length of the positive lens G1$p$, fG1$n$ is a focal length of the negative lens G1$n$, vdG1$n$ is an Abbe number of a material of the negative lens G1$n$, $\theta$gFG1$n$ is a partial dispersion ratio of the negative lens G1$n$, fGkp is a focal length of a positive lens which is included in the third lens unit and is a closest positive lens with respect to the image side and fGkn is a focal length of a negative lens which is included in the third lens unit and is a closest negative lens with respect to the image side.

* * * * *